United States Patent
Parak et al.

(10) Patent No.: US 11,492,875 B2
(45) Date of Patent: Nov. 8, 2022

(54) SIMULATING FLUID PRODUCTION USING A RESERVOIR MODEL AND A TUBING MODEL

(71) Applicant: LANDMARK GRAPHICS CORPORATION, Houston, TX (US)

(72) Inventors: Mahdi Parak, Katy, TX (US); Joseph Chukwuma Nwachukwu, Missouri City, TX (US)

(73) Assignee: Landmark Graphics Corporation, Houston, TX (US)

( * ) Notice: Subject to any disclaimer, the term of this patent is extended or adjusted under 35 U.S.C. 154(b) by 313 days.

(21) Appl. No.: 16/753,146

(22) PCT Filed: Nov. 13, 2017

(86) PCT No.: PCT/US2017/061335
§ 371 (c)(1),
(2) Date: Apr. 2, 2020

(87) PCT Pub. No.: WO2019/094050
PCT Pub. Date: May 16, 2019

(65) Prior Publication Data
US 2020/0256164 A1    Aug. 13, 2020

(51) Int. Cl.
*E21B 43/00*    (2006.01)
*G06F 30/28*    (2020.01)
(Continued)

(52) U.S. Cl.
CPC .............. *E21B 43/00* (2013.01); *E21B 49/00* (2013.01); *G06F 30/28* (2020.01); *E21B 41/00* (2013.01);
(Continued)

(58) Field of Classification Search
CPC .......... E21B 43/00; E21B 49/00; E21B 41/00; E21B 2200/20; E21B 41/0092;
(Continued)

(56) References Cited

U.S. PATENT DOCUMENTS 8,396,826 B2    3/2013    Mijares et al.
8,498,848 B2    7/2013    Habashy et al.
(Continued)

FOREIGN PATENT DOCUMENTS

WO    2008028122 A2    3/2008
WO    2014078891 A1    5/2014

OTHER PUBLICATIONS

Dean, et al., "Reservoir Engineering for Geologists—Volumetric Estimation", Fekete Associates Inc., Article 3, Dec. 2007, pp. 1-4.
(Continued)

*Primary Examiner* — Steven W Crabb
(74) *Attorney, Agent, or Firm* — Kilpatrick Townsend & Stockton LLP (57) ABSTRACT

Fluid production can be simulated using a reservoir model and a tubing model. For example, pressure data and saturation data can be received from a reservoir model simulating a hydrocarbon reservoir in a subterranean formation. A tubing model can be generated by performing nodal analysis using the pressure data and the saturation data. A well-test result can be received that indicates an amount of fluid produced by the wellbore at a particular time. A tuned tubing model can be generated by adjusting the tubing model such that a tubing-model estimate of the amount of fluid produced by the wellbore at the particular time matches the well-test result. An estimated amount of fluid produced by the wellbore can then be determined using the tuned tubing model.
(Continued)

The estimated amount of fluid produced by the wellbore may be used for production allocation or controlling a well tool.

20 Claims, 4 Drawing Sheets

(51) Int. Cl.
  *E21B 49/00* (2006.01)
  *G06F 113/08* (2020.01)
  *G06F 111/10* (2020.01)
  *E21B 41/00* (2006.01)
(52) U.S. Cl.
  CPC ....... *G06F 2111/10* (2020.01); *G06F 2113/08* (2020.01)
(58) Field of Classification Search
  CPC ...... E21B 41/0099; E21B 33/00; G06F 30/28; G06F 2111/10; G06F 2113/08; G06F 30/20
  See application file for complete search history.

(56) References Cited

U.S. PATENT DOCUMENTS

| | | | |
|---|---|---|---|
| 9,026,417 | B2 | 5/2015 | Sequeira, Jr. et al. |
| 2008/0234939 | A1 | 9/2008 | Foot et al. |
| 2009/0012765 | A1* | 1/2009 | Raphael .................. E21B 43/16 703/10 |
| 2010/0023269 | A1* | 1/2010 | Yusti ....................... E21B 43/00 702/12 |
| 2010/0299124 | A1 | 11/2010 | Sun et al. |
| 2011/0040485 | A1 | 2/2011 | Ong |
| 2014/0039860 | A1* | 2/2014 | Carvajal ................. E21B 43/00 703/10 |
| 2016/0209546 | A1 | 7/2016 | Ramsay et al. |
| 2016/0356125 | A1 | 12/2016 | Bello et al. |
| 2017/0067323 | A1 | 3/2017 | Katterbauer et al. |

OTHER PUBLICATIONS

PCT/US2017/061335, "International Search Report and Written Opinion", dated Aug. 10, 2018, 19 pages.

\* cited by examiner

SIMULATING FLUID PRODUCTION USING A RESERVOIR MODEL AND A TUBING MODEL

TECHNICAL FIELD

The present disclosure relates generally to methods and devices for use with well systems. More specifically, but not by way of limitation, this disclosure relates to simulating fluid production in a well system using a reservoir model and a tubing model.

BACKGROUND

A well system can include multiple wellbores drilled through a subterranean formation. The well system can be used to produce fluid, such as oil or gas. The fluid produced by the well system can be referred to as production fluid. Each of the wellbores can contribute to the total volume of production fluid collectively produced by the well system. Some well operators may wish to determine the amount of fluid that each wellbore individually contributed to the total volume of production fluid produced by the well system. This process can be referred to as production allocation (or production back allocation).

In some cases, well systems incorporate physical meters or virtual meters for use in production allocation. Each wellbore can have a designated meter for determining how much fluid the wellbore produced at a given instant in time. But these meters can be expensive, inaccurate, difficult to configure, and difficult to maintain. In other cases, well-system operators may perform well tests to determine the amount of fluid produced by each wellbore at a given instant in time. But a well test involves personnel physically testing an individual wellbore to determine how much fluid is being produced by the wellbore. This makes well tests expensive, labor intensive, and time consuming, often resulting in well tests being performed infrequently (e.g., once every six months or once a year). Also, the results of a well test can become quickly outdated because the characteristics of a wellbore typically vary after the well test is performed. For example, after a well test has been performed for a wellbore, the pressure in the wellbore may dramatically decrease, resulting in less fluid being produced from the wellbore and the results of the well test becoming outdated. But a well operator may not become aware of these changes until the next well test (which can be months later), and may rely on the outdated well-test results in the interim period.

DETAILED DESCRIPTION

Certain aspects and features of the present disclosure relate to simulating fluid production in a well system using a reservoir model and a tubing model. For example, a computing device can execute the reservoir model to simulate a hydrocarbon reservoir in a subterranean formation. The reservoir model can simulate various aspects of the hydrocarbon reservoir, such as the pressure and saturation levels in the hydrocarbon reservoir. The computing device can then use information generated by the reservoir model to create the tubing model. For example, the computing device can use the pressure and saturation levels from the reservoir model to build the tubing model. The tubing model can simulate various aspects of a tubing string (or other well tool) extending through a wellbore in the subterranean formation toward the hydrocarbon reservoir. After creating the tubing model, the computing device can use the tubing model to determine an estimated amount of fluid produced by the wellbore. For example, the computing device can use the tubing model to simulate fluid production from the wellbore over a predefined time interval, such as a one-month interval. After determining the estimated amount of fluid produced by the wellbore, the computing device can use the estimated amount of fluid to (i) perform production allocation, (ii) control the operation of a well tool in the wellbore, or (iii) perform another operation. This can enable a well operator to perform production allocation with greater efficiency and accuracy than other approaches. This may also enable fluid production to be controlled in a partially or fully automated manner.

The reservoir model can be tuned through history matching, History matching can involve adjusting the reservoir model's properties to match how a hydrocarbon reservoir actually performed in the past using real data for the hydrocarbon reservoir. For example, history matching can involve adjusting the model's properties to match historical production data for the hydrocarbon reservoir. The reservoir model can be tuned through history matching when the reservoir model is initially created and/or periodically over time. For example, the reservoir model can be initially tuned when the reservoir is initially created and then further tuned each time additional real data or additional simulated data is obtained for the hydrocarbon reservoir.

The tubing model can be tuned using well-test results. This can be a form of model validation, in which the tubing model is adjusted such that a tubing-model estimate of the amount of fluid produced by the wellbore matches the well-test result. For example, if the well-test result indicates that a wellbore produced 50 Mscf (thousand standard cubic feet) of oil, 0 barrels (bbl) of water, and 5 Mscf of gas on a particular date, one or more parameters of the tubing model can be adjusted until it indicates that the wellbore produced 50 Mscf of oil, 0 bbl of water, and 5 Mscf of gas.

In some examples, an output from the reservoir model is used to tune the tubing model, and an output of the tubing model is used to tune the reservoir model. This can create a feedback loop between the reservoir model and the tubing model, whereby (i) the reservoir model can be tuned based on historical data, outputs from the tubing model, or both of these; and (ii) the tubing model can be tuned based on well-test results, outputs from the reservoir model, or both of these. The feedback loop can result in a more accurate and realistic models (e.g., reservoir and tubing models) than other techniques, thereby enabling the well system to be simulated with greater precision than other techniques. This can enable a well operator to obtain, for example, better fluid-production estimates using the models, which can then be used in a variety of contexts, such as in production allocation.

These illustrative examples are given to introduce the reader to the general subject matter discussed here and are not intended to limit the scope of the disclosed concepts. The following sections describe various additional features and examples with reference to the drawings in which like numerals indicate like elements, and directional descriptions are used to describe the illustrative aspects but, like the illustrative aspects, should not be used to limit the present disclosure.

Figure 1:
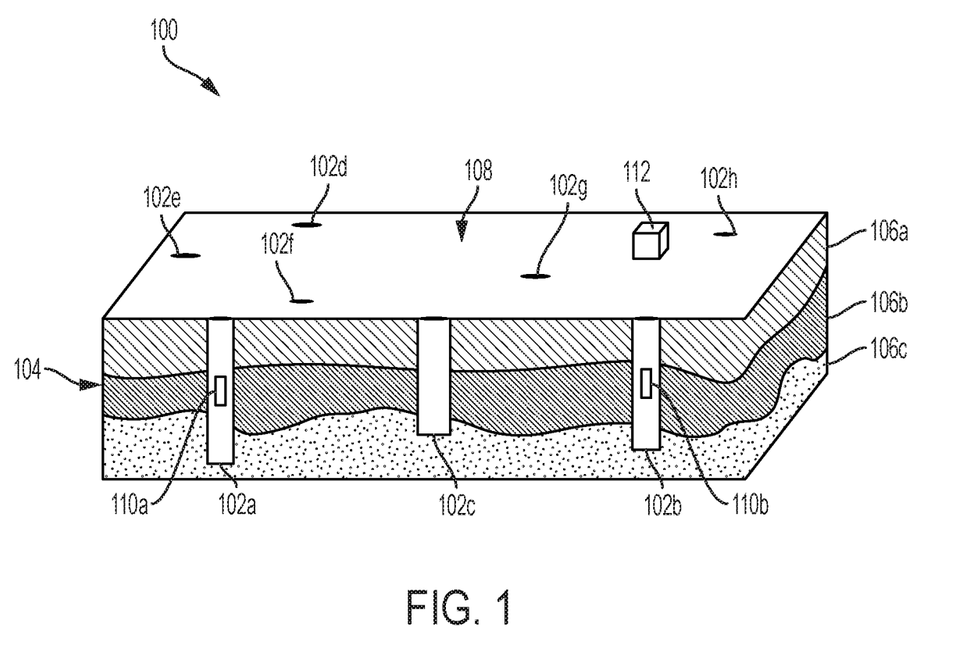
FIG. 1 is a cross-sectional side view of an example of a well system according to some aspects.

FIG. 1 is a cross-sectional side view of an example of a well system 100 according to some aspects. The well system 100 includes multiple wellbores 102a-h drilled through a subterranean formation 104. Although this example shows eight wellbores 102a-h, the well system 100 can include any number and configuration of wellbores. The wellbores 102a-h extend from the well surface 108 into strata 106a-c of the subterranean formation 104. The strata 106a-c can include different materials (e.g., rock, soil, oil, water, or gas) and vary in thickness and shape.

Some or all of the wellbores 102a-h can include well tools, such well tools 110a-b. Examples of the well tools can include drilling tools, sensors, logging tools, fluid-flow control devices, tubing strings, or any combination of these. The well tools may measure various characteristics of the wellbores 102a-h, the subterranean formation 104, or both. For example, well tool 110a can measure a pressure, temperature, saturation, or other characteristic of the wellbore 102a, the subterranean formation 104, or both.

The well tools 110a-h can electronically communicate information (e.g., measurements) to a computing device 112, which can be positioned onsite or offsite. The well tools can electrically communicate with the computing device 112 via a wired or wireless interface, and may electronically communicate with the computing device 112 directly or indirectly, such as over the Internet or another network.

Figure 2:
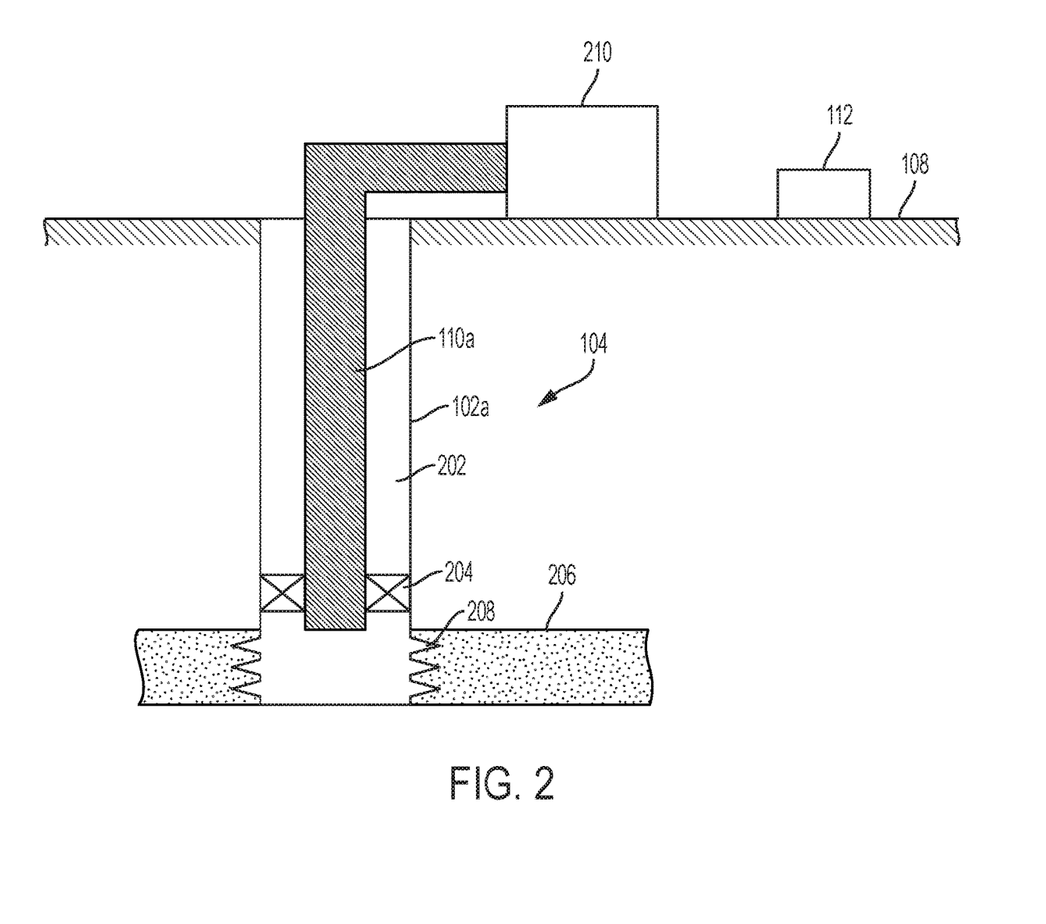
FIG. 2 is a cross-sectional side view of an example of a wellbore in a well system according to some aspects.

The wellbores 110a-h can produce fluid, such as oil, water, or gas. The fluid produced by some or all of the wellbores 110a-h can be communicated from the wellbores 110a-h into a central tank, from which the fluid may be distributed (e.g., to one or more customers). For example, as shown in FIG. 2, wellbore 102a can include a well tool 110a that, in this example, includes a tubing string. One end of the tubing string can be coupled to a surface pipeline for communicating fluid to a tank 210. Another end of the tubing string can extend from the well surface 108 toward a hydrocarbon reservoir 206 in the subterranean formation 104. Perforations 208 in a wall of the wellbore 102a can enable fluid to flow from the hydrocarbon reservoir 206 into the tubing string. The fluid can then flow up the tubing string and into the tank 210. A sealing device 204, such as a packer, can prevent the fluid from the hydrocarbon reservoir 206 from flowing into an annulus area 202 between the tubing string and the wall of the wellbore 102a. Some or all of the wellbores 110a-h of FIG. 1 can be configured in this manner such that they communicate fluid to the same tank 210. But this can make it challenging to determine the amount of fluid that each of the respective wellbores 110a-h contributed to the total volume of fluid in the tank 210.

Some examples of the present disclosure can overcome one or more of the abovementioned issues by simulating fluid production from a wellbore using a reservoir model and a tubing model implemented on the computing device 112. This is described in greater detail below with respect to FIGS. 3-4.

Figure 3:
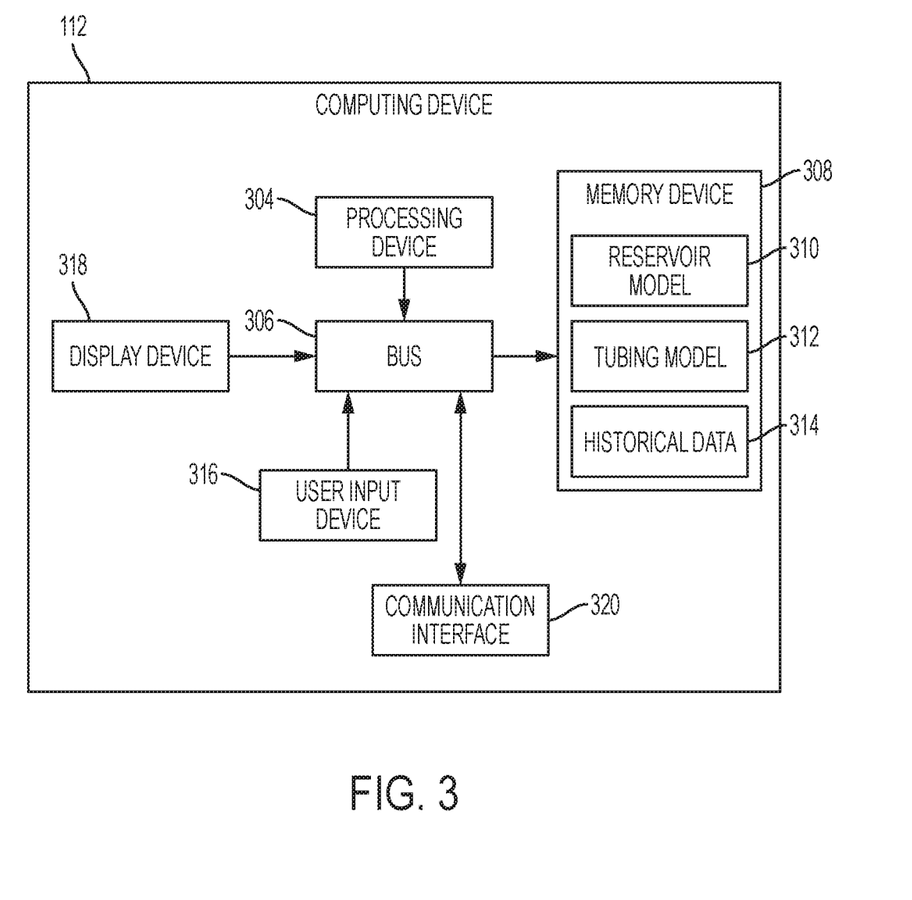
FIG. 3 is a block diagram of an example of a computing device for simulating fluid production from a wellbore using a reservoir model and a tubing model according to some aspects.

FIG. 3 is a block diagram of an example of the computing device 112 for simulating fluid production from a wellbore using a reservoir model and a tubing model according to some aspects. The computing device 112 can include a processing device 304, a bus 306, a memory device 308, a user input device 316, a display device 318, and a communication interface 320. In some examples, some or all of the components shown in FIG. 3 can be integrated into a single structure, such as a single housing. In other examples, some or all of the components shown in FIG. 3 can be distributed (e.g., in separate housings) and in electrical communication with each other.

The processing device 304 can execute one or more operations for simulating fluid production using a reservoir model and a tubing model. The processing device 304 can execute instructions stored in the memory device 308 to perform the operations. The processing device 304 can include one processing device or multiple processing devices. Non-limiting examples of the processing device 304 include a Field-Programmable Gate Array ("FPGA"), an application-specific integrated circuit ("ASIC"), a microprocessing device, etc.

The processing device 304 can be communicatively coupled to the memory device 308 via the bus 306. The non-volatile memory device 308 may include any type of memory device that retains stored information when powered off. Non-limiting examples of the memory device 308 include electrically erasable and programmable read-only memory ("EEPROM"), flash memory, or any other type of non-volatile memory. In some examples, at least some of the memory device 308 can include a medium from which the processing device 304 can read instructions. A computer-readable medium can include electronic, optical, magnetic, or other storage devices capable of providing the processing device 304 with computer-readable instructions or other program code. Non-limiting examples of a computer-readable medium include (but are not limited to) magnetic disk(s), memory chip(s), read-only memory (ROM), random-access memory ("RAM"), an ASIC, a configured processing device, optical storage, or any other medium from which a computer processing device can read instructions. The instructions can include processing device-specific instructions generated by a compiler or an interpreter from code written in any suitable computer-programming language, including, for example, C, C++, C#, etc.

The memory device 308 may include a reservoir model 310. The reservoir model 310 can simulate a hydrocarbon reservoir in a subterranean formation. For example, the reservoir model 310 can simulate the hydrocarbon reservoir 206 of FIG. 2. This can include simulating the past, present, or future behavior of the hydrocarbon reservoir. In some examples, the reservoir model 310 can simulate various properties related to the reservoir, such as subterranean-formation permeability, relative permeability, fluid saturation, reservoir pressure, reservoir temperature, and reservoir fluid properties. Additionally or alternatively, the reservoir model 310 can simulate various production-performance properties of the reservoir, such as multiphase flow rates, cumulative multiphase volumes, or both.

In some examples, the memory device 308 can include a tubing model 312. The tubing model 312 can simulate a tubing string extending through a wellbore in a subterranean formation toward a hydrocarbon reservoir. For example, the tubing model 312 can simulate the well tool 110a of FIG. 2. This can include simulating the past, present, or future behavior of the tubing string. In some examples, the tubing model 312 can simulate various properties related to the tubing string, such as fluid flow through the tubing string or a pressure differential across the tubing string.

In some examples, the memory device 308 can include historical data 314. The historical data 314 can include information related to how a hydrocarbon reservoir performed in the past. For example, the historical data 314 can include past fluid-production properties associated with the hydrocarbon reservoir. The historical data 314 can be used for performing history matching, which can include adjusting a model's properties to match how a hydrocarbon reservoir actually performed in the past, as described in greater detail below with respect to FIG. 4.

The computing device 112 can include a user input device 316. The user input device 316 can represent one or more components used to input data. Examples of the user input device 316 can include a keyboard, mouse, touchpad, button, or touch-screen display, etc.

The computing device 112 can include a display device 318. The display device 318 can represent one or more components used to output data. Examples of the display device 318 can include a liquid-crystal display (LCD), a television, a computer monitor, a touch-screen display, etc. In some examples, the user input device 316 and the display device 318 can be a single device, such as a touch-screen display.

The computing device 112 can include a communication interface 320. The communication interface 320 can represent one or more components that facilitate a network connection or otherwise facilitate electronic communication between electronic devices. Examples include, but are not limited to, wired interfaces such as Ethernet, USB, IEEE 1394, and/or wireless interfaces such as IEEE 802.11, Bluetooth, near-field communication (NFC) interfaces, RFID interfaces, or radio interfaces for accessing cellular telephone networks (e.g., transceiver/antenna for accessing a CDMA, GSM, UMTS, or other mobile communications network).

Figure 4:
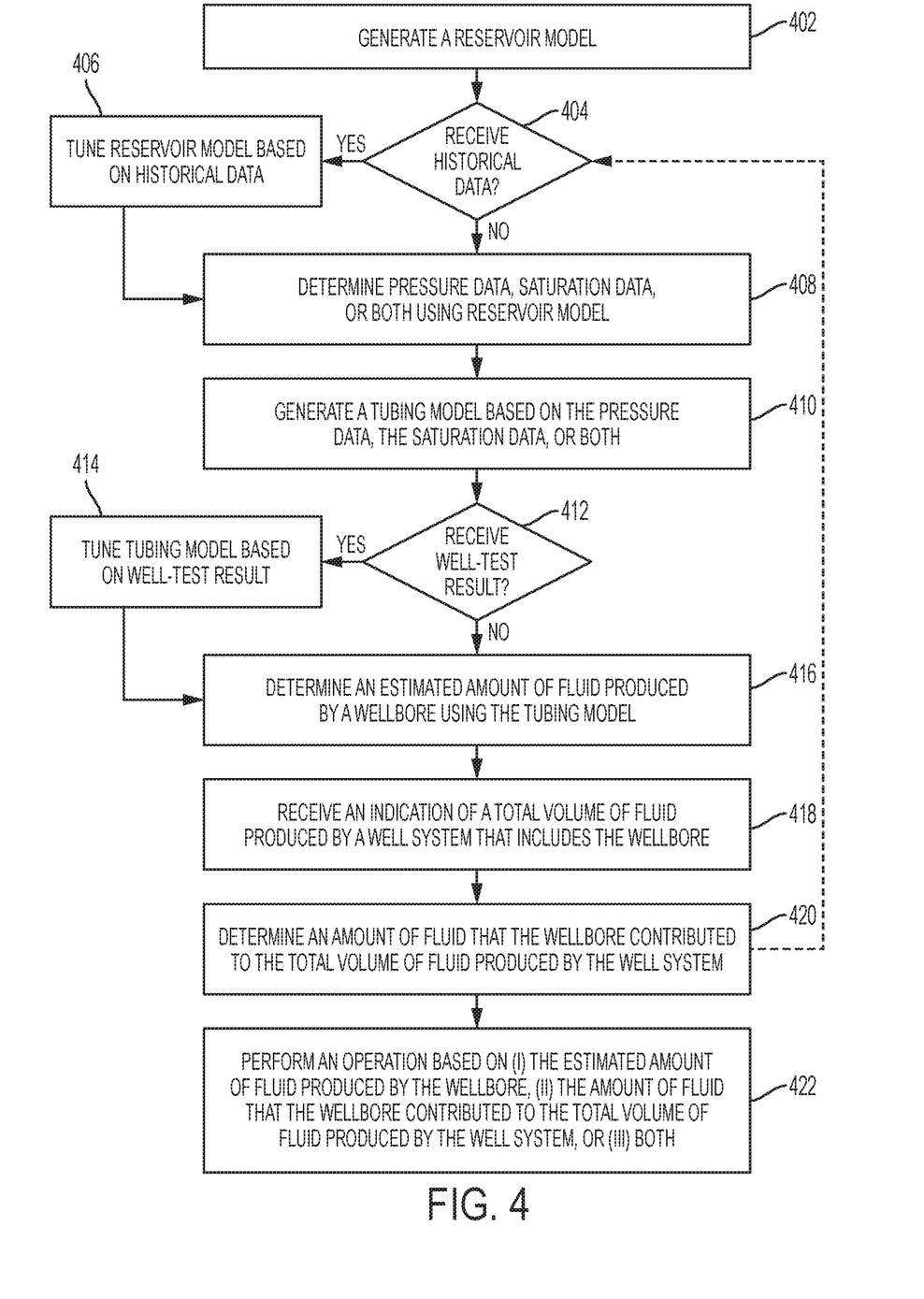
FIG. 4 is a flow chart of an example of a process for simulating fluid production using a reservoir model and a tubing model according to some aspects.

In some examples, the computing device 112 can perform one or more of the steps shown in FIG. 4 to simulate fluid production in a well system. In other examples, the computing device 112 can perform more steps, fewer steps, or a different combination of the steps shown in FIG. 4. The steps below are described with reference to the components discussed above.

In block 402, a processing device 304 generates a reservoir model 310. For example, the processing device 304 can generate the reservoir model 310 by performing numerical analysis on one or more equations related to the behavior of a hydrocarbon reservoir. Numerical analysis can include an iterative approach for obtaining approximate solutions to one or more equations. For example, the processing device 304 can solve a system of equations related to the behavior of a hydrocarbon reservoir to determine values for one or more variables in the system of equations. The processing device 304 may solve the system of equations using numerical analysis or another approach. The processing device 304 may then use the values for the variables to generate the reservoir model 310. Any number and combination of techniques can be used to generate the reservoir model 310.

In block 404, the processing device 304 determines if historical data 314 has been received. The historical data 314 can be, for example, historical production data indicating hydrocarbon production from a reservoir. The historical data 314 can be received from another computing device, a well tool, a sensor, a user input device, or any combination of these. For example, the processing device 304 can receive the historical data 314 as user input via a user input device.

As another example, the processing device 304 can receive the historical data 314 from a remote database or a remote computing device.

If the processing device 304 determines that historical data 314 has been received, the process can proceed to block 406 where the processing device 304 tunes the reservoir model 310 based on the historical data. For example, the processing device 304 can tune the reservoir model 310 by performing history matching using the historical data 314. This can involve adjusting one or more properties of the reservoir model 310 to match one or more parameters in the historical data. As a specific example, if the historical data 314 indicates that a wellbore produced 100 bbl of oil, 5 bbl of water, and 0 Mscf of gas on a particular date, the processing device 304 can adjust one or more properties of the reservoir model 310 until the reservoir model 310 indicates that the wellbore produced 100 bbl of oil. 5 bbl of water, and 0 Mscf of gas on the particular date.

In some examples, the processing device 304 can iterate the steps of blocks 404-406 each time the processing device 304 receives new historical data 314, which may be at multiple points during the process of FIG. 4. This can result in the reservoir model 310 repeatedly being updated as new historical data becomes available, which may increase the accuracy of the reservoir model 310.

In block 408, the processing device 304 determines pressure data, saturation data, or both using the reservoir model 310. The pressure data can include estimates of one or more pressures in the hydrocarbon reservoir. For example, the pressure data can includes multiple estimates of pressure in the reservoir over a predefined time period, such as a week or a month. The saturation data can include estimates of one or more saturation levels associated with the hydrocarbon reservoir. For example, the saturation data can include multiple estimates of fluid saturation in the hydrocarbon reservoir over a predefined time period, such as a week or a month.

In some examples, the processing device 304 can receive the pressure data and saturation data as an output from the reservoir model 310. In other examples, the processing device 304 can receive the pressure data and saturation data from a remote computing device, which may have the reservoir model 310, In another example, the processing device 304 can obtain the pressure data and saturation data from a remote database, which may store the pressure data and saturation data (which, in turn, may be generated by the reservoir model 310). Any number and combination of the abovementioned techniques can be used to determine the pressure data, the saturation data, or both.

In block 410, the processing device 304 generates a tubing model based on the pressure data, the saturation data, or both. In some examples, the tubing model 312 can be a vertical-lift-performance model, an inflow performance relationship model (IPR), or a combination of these. The processing device 304 can generate the tubing model 312 using any number and combination of techniques. One example technique for generating the tubing model 312 includes nodal analysis. Nodal analysis can involve dividing up a wellbore into multiple sections (or "nodes") and determining differences (e.g., pressure differences) between adjacent sections of the wellbore. The processing device 304 can perform the nodal analysis using the pressure data, saturation data, or both from the reservoir model 310. For example, the processing device 304 can select a hydrocarbon reservoir as a starting node (or ending node) when performing nodal analysis. The processing device 304 can use the pressure data and the saturation data from the reservoir model 310 to define the pressure characteristics and saturation characteristics, respectively, for the starting node. The processing device 304 may then perform nodal analysis using these characteristics of the starting node.

In block 412, the processing device 304 determines if a well-test result has been received. The well-test result can include, for example, a pressure in the wellbore, a temperature in the wellbore, a volume of fluid produced by the wellbore, or any combination of these. If the fluid produced by the wellbore is a multiphase fluid, the well-test result can additionally or alternatively include the amount of each fluid phase that was produced by the wellbore. The well-test result may additionally or alternatively indicate other properties associated with the wellbore.

In some examples, the processing device 304 can receive the well-test result from another computing device, a well tool, a sensor, a user input device, or any combination of these. For example, the processing device 304 can receive the well-test result as user input via a user input device. As another example, the processing device 304 can receive the well-test result from a remote database or a remote computing device.

If the processing device 304 determines that a well-test result has been received, the process can continue to block 414 where the processing device 304 tunes the tubing model 312 based on the well-test result. This can involve adjusting one or more properties of the tubing model 312 to match one or more parameters in the well-test result. As a specific example, if the well-test result indicates that a wellbore produced 50 Mscf of oil, 10 bbl of water, and 5 Mscf of gas on a particular date, the processing device 304 can adjust one or more properties of the tubing model 312 until the tubing model 312 indicates that the wellbore produced 50 Mscf of oil, 10 bbl of water, and 5 Mscf of gas on the particular date. Thus, tuning the tubing model 312 can involve model validation, in which the tubing model 312 is adjusted such that a tubing-model estimate of the amount of fluid produced by the wellbore matches the well-test result.

In some examples, the processing device 304 can iterate the steps of blocks 412-414 each time the processing device 304 receives a new well-test result, which may be at multiple points during the process of FIG. 4. This can result in the tubing model 312 repeatedly being updated as new well-test results become available (e.g., once every few months), which may increase the accuracy of the tubing model 312.

In block 416, the processing device 304 determines an estimated amount of fluid produced by a wellbore using the tubing model 312, If the fluid is a multiphase fluid, the processing device 304 can determine the amount of each fluid phase produced by the wellbore using the tubing model 312. The estimated amount of fluid can include a single value for a single date (e.g., a specific day) or multiple values for multiple dates over the course of a predetermined time period. For example, the tubing model 312 can forecast the amount of fluid that will be produced by the wellbore over a one-month time period at daily intervals. The tubing model 312 can then output 28-31 values (depending on the month) indicating the estimated amount of fluid produced by the wellbore for each day of the month.

In block 418, the processing device 304 receives an indication of a total volume of fluid produced by a well system that includes the wellbore. This can be an accurate representation of the total volume of fluid actually produced by the well system. For example, if the wellbore is wellbore 102a of FIG. 1, the processing device 304 can receive an indication of the total volume of fluid produced by all the wellbores 102a-h in the well system 100. The processing device 304 can receive the indication of the total volume of fluid produced by the well system from another computing device, a sensor (e.g., in a tank, such as tank 210), or a user input device. For example, the processing device 304 can receive the indication as user input via a user input device. As another example, the processing device 304 can receive the indication from a remote database or a remote computing device. In some examples, the total volume of fluid produced by the well system can be determined at a sales point.

In block 420, the processing device 304 determines an amount of fluid that the wellbore contributed to the total volume of fluid produced by the well system. For example, the processing device 304 can divide the estimated amount of fluid produced by the wellbore (from block 416) by the total volume of fluid produced by the well system (from block 418) to determine what percentage of fluid the wellbore contributed to the total volume of fluid produced by the well system. The processing device 304 can use any number and combination of techniques to determine the amount of fluid that the wellbore contributed to the total volume of fluid produced by the well system.

In some examples, the amount of fluid that the wellbore contributed to the total volume of fluid produced by the well system can be used to tune the reservoir model 310. Tuning the reservoir model 310 in this manner can result in an updated version of the reservoir model 310. The updated version of the reservoir model can then produce updated pressure data, saturation data, or both. In some examples, the updated pressure data, saturation data, or both can then be used to further tune the tubing model 312. This can create a feedback loop in which an output from the reservoir model 310 is used to tune the tubing model 312, and information derived from the tubing model 312 is used to tune the reservoir model 310. In one particular example, the reservoir model 310 may depend on fluid-production characteristics of the wellbore. So, the amount of fluid that the wellbore contributed to the total volume of fluid produced by the well system can be used to further tune the reservoir model 310. This can result in an updated version of the reservoir model 310, which can be used to further tune the tubing model 312.

Some or all of the above steps can iterate, such that (i) the reservoir model 310 is repeatedly updated based on new historical data and information from the tubing model 312, and (ii) the tubing model 312 is repeatedly updated based on new well-test results and information from the reservoir model 310. This feedback loop can result in a more accurate and realistic models (e.g., reservoir and tubing models) than other techniques, thereby enabling the well system to be simulated with greater precision than other techniques. This can enable a well operator to obtain, for example, better fluid-production estimates using the models, which can then be used in a variety of contexts, such as in production allocation.

In block 422, the processing device 304 performs an operation based on (i) the estimated amount of fluid produced by the wellbore (from block 416), (ii) the amount of fluid that the wellbore contributed to the total volume of fluid produced by the well system (from block 420), or (iii) both of these. Examples of the operation can include updating a visual simulation, transmitting an electronic communication, adjusting an operational setting of a well tool, or any combination of these. The processing device 304 can perform any number and combination of operations based on the estimated amount of fluid produced by the wellbore, the amount of fluid that the wellbore contributed to the total volume of fluid produced by the well system, or both.

For example, the operation can include updating a visual simulation (e.g., output on display device 318) associated with the well system based on the estimated amount of fluid produced by the wellbore, the amount of fluid that the wellbore contributed to the total volume of fluid produced by the well system, or both. The visual simulation can visually represent the wellbore, the well system, or both, and may visually indicate fluid flow through the wellbore. The visual simulation may enable a well operator to quickly and easily assess the performance of the wellbore or well system for problems or hazards.

As another example, the operation can include transmitting an electronic communication to a remote computing device based on the estimated amount of fluid produced by the wellbore, the amount of fluid that the wellbore contributed to the total volume of fluid produced by the well system, or both. The electronic communication may indicate the estimated amount of fluid produced by the wellbore, the amount of fluid that the wellbore contributed to the total volume of fluid produced by the well system, or both. The remote computing device can receive the electronic communication and responsively perform another operation, such as adjusting a fluid-flow control device (e.g., a valve) to increase or reduce fluid flow through the wellbore.

As another example, the operation can include adjusting an operational setting of a well tool based on the estimated amount of fluid produced by the wellbore, the amount of fluid that the wellbore contributed to the total volume of fluid produced by the well system, or both. The operational setting can be a programmable setting or a physical property of the well tool. In some examples, adjusting the operational setting can include causing the well tool to physically move (e.g., between at least two positions), such as by opening or closing a valve, adjusting a choke valve, inflating or deflating a packer, changing shape, bending, moving uphole or downhole, or any combination of these. As a particular example in which the well tool includes a production valve, the operational setting of the production valve can be adjusted to change the amount of fluid produced by the wellbore, such as to increase or decrease the amount of fluid produced by the wellbore. By adjusting an operational setting of a well tool based on the results of one or more steps in FIG. 4, the characteristics of the well system (e.g., the volume of production fluid produced by a wellbore) can be controlled in a partially or fully automated manner.

The processing device 304 may perform some or all of the steps in FIG. 4 for each individual wellbore in a well system. For example, the processing device 304 may generate separate reservoir models, separate tubing models, or both for each individual wellbore in a well system. In one example, each wellbore in the well system can have its own reservoir model and its own tubing model. In another example, all of the wellbores in a well system may share a common hydrocarbon reservoir. So, each wellbore in the well system can have its own tubing model and can share a single reservoir model with the other wellbores. The processing device 304 can then use the reservoir model(s) and tubing models for each wellbore to determine properties of the wellbores, properties of the well system, or both. For example, the processing device 304 can use the reservoir models and the tubing models to determine the amount of fluid that each wellbore contributed to a total volume of fluid produced by the well system.

In some aspects fluid production can be simulated using a reservoir model and a tubing model according to one or more of the following examples:

Example #1: A method can include receiving pressure data and saturation data from a reservoir model that simulates a hydrocarbon reservoir in a subterranean formation. The pressure data can include estimates of a plurality of pressures in the hydrocarbon reservoir and the saturation data can include estimates of a plurality of saturation levels associated with the hydrocarbon reservoir. The method can include generating a tubing model by performing nodal analysis using the pressure data and the saturation data. The tubing model can simulate a tubing string extending through a wellbore in the subterranean formation toward the hydrocarbon reservoir. The method can include receiving a well-test result indicating an amount of fluid produced by the wellbore at a particular time. The method can include generating a tuned tubing model by adjusting the tubing model such that a tubing-model estimate of the amount of fluid produced by the wellbore at the particular time matches the well-test result. The method can include determining an estimated amount of fluid produced by the wellbore using the tuned tubing model. The method can include adjusting an operational setting of a well tool based on the estimated amount of fluid produced by the wellbore. Some or all of the method steps can be implemented by a processing device.

Example #2: The method of Example #1 may include receiving updated pressure data and updated saturation data from the reservoir model. The method may include generating an updated version of the tubing model using the updated pressure data and the updated saturation data. Some or all of these steps can be performed after tuning the reservoir model.

Example #3: The method of any of Examples #1-2 may include receiving an indication of a total volume of fluid produced by a well system that includes the wellbore. The method may include determining an amount of fluid that the wellbore contributed to the total volume of fluid using the estimated amount of fluid produced by the wellbore.

Example #4: The method of Example #3 may feature the well system including multiple wellbores. The method may include, for each respective wellbore in the plurality of wellbores, determining a respective amount of fluid that the respective wellbore contributed to the total volume of fluid produced by the well system using a respective tubing model associated with the respective wellbore.

Example #5: The method of any of Examples #3-4 may include tuning the reservoir model based on the amount of fluid that the wellbore contributed to the total volume of fluid produced by the well system.

Example #6: The method of any of Examples #1-5 may include receiving historical production data indicating past production characteristics associated with the hydrocarbon reservoir. The method may include tuning the reservoir model using the historical production data. Some or all of these steps can be performed prior to receiving the pressure data and the saturation data.

Example #7: The method of any of Examples #1-6 may include adjusting the operational setting for a well tool at least in part by causing the well tool to physically move from a first position to a second position.

Example #8: A system can include a processing device and a memory device including instructions that are executable by the processing device. The instructions can cause the processing device to receive pressure data and saturation data from a reservoir model that simulates a hydrocarbon reservoir in a subterranean formation. The pressure data can indicate estimates of a plurality of pressures in the hydrocarbon reservoir and the saturation data can indicate estimates of a plurality of saturation levels associated with the hydrocarbon reservoir. The instructions can cause the processing device to generate a tubing model by performing nodal analysis using the pressure data and the saturation data. The tubing model can simulate a tubing string extending through a wellbore in the subterranean formation toward the hydrocarbon reservoir. The instructions can cause the processing device to receive a well-test result indicating an amount of fluid produced by the wellbore at a particular time. The instructions can cause the processing device to generate a tuned tubing model by adjusting the tubing model such that a tubing-model estimate of the amount of fluid produced by the wellbore at the particular time matches the well-test result. The instructions can cause the processing device to determine an estimated amount of fluid produced by the wellbore using the tuned tubing model. The instructions can cause the processing device to adjust an operational setting of a well tool based on the estimated amount of fluid produced by the wellbore.

Example #9: The system of Example #8 may feature the memory device further comprising instructions that are executable by the processing device for causing the processing device to tune the reservoir model based on information derived from the estimated amount of fluid produced by the wellbore.

Example #10: The system of any of Examples #8-9 may feature the memory device further comprising instructions that are executable by the processing device for causing the processing device to receive updated pressure data and updated saturation data from the reservoir model. The instructions can cause the processing device to generate an updated version of the tubing model using the updated pressure data and the updated saturation data, Some or both of these steps can be performed after tuning the reservoir model.

Example #11: The system of any of Examples #8-10 may feature the memory device further comprising instructions that are executable by the processing device for causing the processing device to receive an indication of a total volume of fluid produced by a well system that includes the wellbore. The instructions can cause the processing device to determine an amount of fluid that the wellbore contributed to the total volume of fluid using the estimated amount of fluid produced by the wellbore.

Example #12: The system of Example #11 may feature the well system comprising a plurality of wellbores. The memory device can further comprise instructions that are executable by the processing device for causing the processing device to, for each respective wellbore in the plurality of wellbores, determine a respective amount of fluid that the respective wellbore contributed to the total volume of fluid produced by the well system using a respective tubing model associated with the respective wellbore.

Example #13: The system of any of Examples #8-12 may feature the memory device further comprising instructions that are executable by the processing device for causing the processing device to receive historical production data indicating past production characteristics associated with the hydrocarbon reservoir. The instructions can cause the processing device to tune the reservoir model using the historical production data. Some or all of these steps can be performed prior to receiving the pressure data and the saturation data.

Example #14: The system of any of Examples #8-13 may feature the memory device further comprising instructions that are executable by the processing device for causing the processing device to adjust the operational setting for the well tool to cause the well tool to physically move from a first position to a second position.

Example #15: A non-transitory computer-readable medium can include program code that is executable by a processing device for causing the processing device to perform operations. The operations can include receiving pressure data and saturation data from a reservoir model that simulates a hydrocarbon reservoir in a subterranean formation. The pressure data can include estimates of a plurality of pressures in the hydrocarbon reservoir and the saturation data can include estimates of a plurality of saturation levels associated with the hydrocarbon reservoir. The operations can include generating a tubing model by performing nodal analysis using the pressure data and the saturation data. The tubing model can simulate a tubing string extending through a wellbore in the subterranean formation toward the hydrocarbon reservoir. The operations can include receiving a well-test result indicating an amount of fluid produced by the wellbore at a particular time. The operations can include generating a tuned tubing model by adjusting the tubing model such that a tubing-model estimate of the amount of fluid produced by the wellbore at the particular time matches the well-test result. The operations can include determining an estimated amount of fluid produced by the wellbore using the tuned tubing model. The operations can include adjusting an operational setting of a well tool based on the estimated amount of fluid produced by the wellbore.

Example #16: The non-transitory computer-readable medium of Example #15 may further comprise program code that is executable by the processing device for causing the processing device to tune the reservoir model based on the estimated amount of fluid produced by the wellbore.

Example #17: The non-transitory computer-readable medium of any of Examples #15-16 may further comprise program code that is executable by the processing device for causing the processing device to receive updated pressure data and updated saturation data from the reservoir model. The program code may cause the processing device to generate an updated version of the tubing model using the updated pressure data and the updated saturation data. Some or all of these steps can be performed after tuning the reservoir model.

Example #18: The non-transitory computer-readable medium of any of Examples #15-17 may further comprise program code that is executable by the processing device for causing the processing device to receive an indication of a total volume of fluid produced by a well system that includes the wellbore. The program code can cause the processing device to determine an amount of fluid that the wellbore contributed to the total volume of fluid using the estimated amount of fluid produced by the wellbore.

Example #19: The non-transitory computer-readable medium of any of Examples #15-18 may feature the well system comprising a plurality of wellbores, and further comprise program code that is executable by the processing device for causing the processing device to, for each respective wellbore in the plurality of wellbores, determine a respective amount of fluid that the respective wellbore contributed to the total volume of fluid produced by the well system using a respective tubing model associated with the respective wellbore.

Example #20: The non-transitory computer-readable medium of any of Examples #15-19 may further comprise program code that is executable by the processing device for causing the processing device to receive historical production data indicating past production characteristics associated with the hydrocarbon reservoir. The program code can cause the processing device to tune the reservoir model using the historical production data. Some or all of these steps can be implemented prior to receiving the pressure data and the saturation data.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure.

The invention claimed is:

1. A method comprising:
receiving, by a processing device, pressure data and saturation data from a reservoir model that simulates a hydrocarbon reservoir in a subterranean formation, the pressure data including estimates of a plurality of pressures in the hydrocarbon reservoir and the saturation data including estimates of a plurality of saturation levels associated with the hydrocarbon reservoir;
generating, by the processing device, a tubing model by performing nodal analysis involving:
dividing the tubing model into a plurality of nodes;
determining characteristics of a first node of the plurality of nodes within the tubing model using the pressure data and the saturation data; and
determining characteristics of a second node of the plurality of nodes that is adjacent to the first node using the characteristics of the first node, the pressure data, and the saturation data, the tubing model simulating a tubing string extending through a wellbore in the subterranean formation toward the hydrocarbon reservoir, the tubing string being distinct from the wellbore;
receiving, by the processing device, a well-test result indicating an amount of fluid produced by the wellbore at a particular time;
generating, by the processing device, a tuned tubing model by adjusting the tubing model such that a tubing-model estimate of the amount of fluid produced by the wellbore at the particular time matches the well-test result;
determining, by the processing device, an estimated amount of fluid produced by the wellbore using the tuned tubing model; and
adjusting an operational setting of a well tool based on the estimated amount of fluid produced by the wellbore.

2. The method of claim 1, further comprising, after tuning the reservoir model:
receiving updated pressure data and updated saturation data from the reservoir model; and
generating an updated version of the tubing model using the updated pressure data and the updated saturation data.

3. The method of claim 1, further comprising:
receiving an indication of a total volume of fluid produced by a well system that includes the wellbore; and
determining an amount of fluid that the wellbore contributed to the total volume of fluid using the estimated amount of fluid produced by the wellbore.

4. The method of claim 3, wherein the well system comprises a plurality of wellbores, and further comprising:
for each respective wellbore in the plurality of wellbores, determining a respective amount of fluid that the respective wellbore contributed to the total volume of fluid produced by the well system using a respective tubing model associated with the respective wellbore.

5. The method of claim 3, further comprising tuning the reservoir model based on the amount of fluid that the wellbore contributed to the total volume of fluid produced by the well system.

6. The method of claim 1, further comprising, prior to receiving the pressure data and the saturation data:
receiving historical production data indicating past production characteristics associated with the hydrocarbon reservoir; and
tuning the reservoir model using the historical production data.

7. The method of claim 1, wherein adjusting the operational setting for a well tool comprises causing the well tool to physically move from a first position to a second position.

8. A system comprising:
a processing device; and
a memory device including instructions that are executable by the processing device for causing the processing device to:
receive pressure data and saturation data from a reservoir model that simulates a hydrocarbon reservoir in a subterranean formation, the pressure data indicating estimates of a plurality of pressures in the hydrocarbon reservoir and the saturation data indicating estimates of a plurality of saturation levels associated with the hydrocarbon reservoir;
generate a tubing model by performing nodal analysis involving:
dividing the tubing model into a plurality of nodes;
determining characteristics of a first node of the plurality of nodes within the tubing model using the pressure data and the saturation data; and
determining characteristics of a second node of the plurality of nodes that is adjacent to the first node using the characteristics of the first node, the pressure data, and the saturation data, the tubing model simulating a tubing string extending through a wellbore in the subterranean formation toward the hydrocarbon reservoir, the tubing string being distinct from the wellbore;
receive a well-test result indicating an amount of fluid produced by the wellbore at a particular time;
generate a tuned tubing model by adjusting the tubing model such that a tubing-model estimate of the amount of fluid produced by the wellbore at the particular time matches the well-test result;
determine an estimated amount of fluid produced by the wellbore using the tuned tubing model; and
adjust an operational setting of a well tool based on the estimated amount of fluid produced by the wellbore.

9. The system of claim 8, wherein the memory device further comprising instructions that are executable by the processing device for causing the processing device to tune the reservoir model based on information derived from the estimated amount of fluid produced by the wellbore.

10. The system of claim 9, wherein the memory device further comprising instructions that are executable by the processing device for causing the processing device to, after tuning the reservoir model:
receive updated pressure data and updated saturation data from the reservoir model; and
generate an updated version of the tubing model using the updated pressure data and the updated saturation data.

11. The system of claim 8, wherein the memory device further comprising instructions that are executable by the processing device for causing the processing device to:

receive an indication of a total volume of fluid produced by a well system that includes the wellbore; and determine an amount of fluid that the wellbore contributed to the total volume of fluid using the estimated amount of fluid produced by the wellbore.

12. The system of claim 11, wherein the well system comprises a plurality of wellbores, and wherein the memory device further comprising instructions that are executable by the processing device for causing the processing device to:

for each respective wellbore in the plurality of wellbores, determine a respective amount of fluid that the respective wellbore contributed to the total volume of fluid produced by the well system using a respective tubing model associated with the respective wellbore.

13. The system of claim 8, wherein the memory device further comprising instructions that are executable by the processing device for causing the processing device to, prior to receiving the pressure data and the saturation data:

receive historical production data indicating past production characteristics associated with the hydrocarbon reservoir; and tune the reservoir model using the historical production data.

14. The system of claim 8, wherein the memory device further comprising instructions that are executable by the processing device for causing the processing device to adjust the operational setting for the well tool to cause the well tool to physically move from a first position to a second position.

15. A non-transitory computer-readable medium comprising program code that is executable by a processing device for causing the processing device to:

receive pressure data and saturation data from a reservoir model that simulates a hydrocarbon reservoir in a subterranean formation, the pressure data indicating estimates of a plurality of pressures in the hydrocarbon reservoir and the saturation data indicating estimates of a plurality of saturation levels associated with the hydrocarbon reservoir;

generate a tubing model by performing nodal analysis involving:
  dividing the tubing model into a plurality of nodes;
  determining characteristics of a first node of the plurality of nodes within the tubing model using the pressure data and the saturation data; and
  determining characteristics of a second node of the plurality of nodes that is adjacent to the first node using the characteristics of the first node, the pressure data, and the saturation data, the tubing model simulating a tubing string extending through a wellbore in the subterranean formation toward the hydrocarbon reservoir, and the tubing string being distinct from the wellbore;

receive a well-test result indicating an amount of fluid produced by the wellbore at a particular time;

generate a tuned tubing model by adjusting the tubing model such that a tubing-model estimate of the amount of fluid produced by the wellbore at the particular time matches the well-test result;

determine an estimated amount of fluid produced by the wellbore using the tuned tubing model; and adjust an operational setting of a well tool based on the estimated amount of fluid produced by the wellbore.

16. The non-transitory computer-readable medium comprising of claim 15, further comprising program code that is executable by the processing device for causing the processing device to tune the reservoir model based on the estimated amount of fluid produced by the wellbore.

17. The non-transitory computer-readable medium comprising of claim 16, further comprising program code that is executable by the processing device for causing the processing device to, after tuning the reservoir model:

receive updated pressure data and updated saturation data from the reservoir model; and generate an updated version of the tubing model using the updated pressure data and the updated saturation data.

18. The non-transitory computer-readable medium comprising of claim 15, further comprising program code that is executable by the processing device for causing the processing device to:

receive an indication of a total volume of fluid produced by a well system that includes the wellbore; and determine an amount of fluid that the wellbore contributed to the total volume of fluid using the estimated amount of fluid produced by the wellbore.

19. The non-transitory computer-readable medium comprising of claim 18, wherein the well system comprises a plurality of wellbores, and further comprising program code that is executable by the processing device for causing the processing device to:

for each respective wellbore in the plurality of wellbores, determine a respective amount of fluid that the respective wellbore contributed to the total volume of fluid produced by the well system using a respective tubing model associated with the respective wellbore.

20. The non-transitory computer-readable medium comprising of claim 15, further comprising program code that is executable by the processing device for causing the processing device to, prior to receiving the pressure data and the saturation data:

receive historical production data indicating past production characteristics associated with the hydrocarbon reservoir; and tune the reservoir model using the historical production data.

* * * * *